US008864887B2

(12) United States Patent
Heath et al.

(10) Patent No.: US 8,864,887 B2
(45) Date of Patent: Oct. 21, 2014

(54) HIGH EFFICIENCY SLUG CONTAINING VAPOR RECOVERY

(76) Inventors: Rodney T. Heath, Farmington, NM (US); Forrest D. Heath, Katy, TX (US); Gary Heath, Farmington, NM (US)

(*) Notice: Subject to any disclaimer, the term of this patent is extended or adjusted under 35 U.S.C. 154(b) by 112 days.

(21) Appl. No.: 13/250,559

(22) Filed: Sep. 30, 2011

(65) Prior Publication Data

US 2012/0079851 A1 Apr. 5, 2012

Related U.S. Application Data

(60) Provisional application No. 61/388,468, filed on Sep. 30, 2010.

(51) Int. Cl.
| | | |
|---|---|---|
| B01D 53/14 | (2006.01) | |
| B01D 3/32 | (2006.01) | |
| C10L 3/00 | (2006.01) | |
| B01D 3/42 | (2006.01) | |
| B01D 3/06 | (2006.01) | |

(52) U.S. Cl.
CPC . *B01D 3/322* (2013.01); *C10L 3/00* (2013.01); *B01D 3/42* (2013.01); *B01D 3/06* (2013.01)
USPC .......... 96/234; 96/242; 96/253; 95/173; 95/174; 95/178; 95/193; 95/209; 95/158

(58) Field of Classification Search
USPC .......... 95/172, 192, 208, 266, 254, 247, 258, 95/19, 22, 24, 158, 173, 174, 178, 193, 95/209; 96/234, 245, 253, 244, 155, 156, 96/157, 174, 193; 166/267
See application file for complete search history.

(56) References Cited

U.S. PATENT DOCUMENTS

| | | |
|---|---|---|
| 844,694 A | 2/1907 | Smith |
| 1,903,481 A | 4/1933 | Schweisthal |
| 2,225,959 A | 12/1940 | Miller |
| 2,726,729 A | 12/1955 | Williams |
| 2,738,026 A | 3/1956 | Glasgow et al. |
| 2,765,872 A | 10/1956 | Hartman et al. |
| 2,786,543 A | 3/1957 | Hayes et al. |
| 2,812,827 A | 11/1957 | Worley et al. |

(Continued)

FOREIGN PATENT DOCUMENTS

| | | |
|---|---|---|
| AR | 011862 | 9/2000 |
| AR | 024366 | 10/2002 |

(Continued)

OTHER PUBLICATIONS

"Environmental Technology Verification Report", Greenhouse Gas Technology Center Southern Research Institute.

(Continued)

*Primary Examiner* — Duane Smith
*Assistant Examiner* — Cabrena Holecek
(74) *Attorney, Agent, or Firm* — Peacock Myers, P.C.; Deborah A. Peacock; Justin R. Jackson (57) ABSTRACT

A slug-containing vapor recovery system wherein pressure and/or fluid level sensors are provided which monitor for conditions caused by the entry of a slug of hydrocarbon liquid, including that caused by a plunger-lift system. The system can be configured to accommodate virtually any anticipated slug-events.

16 Claims, 8 Drawing Sheets

(56) References Cited

U.S. PATENT DOCUMENTS

| | | |
|---|---|---|
| 2,815,901 A | 12/1957 | Hale |
| 2,853,149 A | 9/1958 | Gosselin |
| 2,937,140 A | 5/1960 | Stinson |
| 2,970,107 A | 1/1961 | Gilmore |
| 2,984,360 A | 5/1961 | Smith |
| 3,018,640 A | 1/1962 | Heller et al. |
| 3,025,928 A | 3/1962 | Heath |
| 3,027,651 A | 4/1962 | Nerge |
| 3,094,574 A | 6/1963 | Glasgow et al. |
| 3,105,855 A | 10/1963 | Meyers |
| 3,152,753 A | 10/1964 | Adams |
| 3,182,434 A | 5/1965 | Fryar |
| 3,237,847 A | 3/1966 | Wilson |
| 3,254,473 A | 6/1966 | Fryar et al. |
| 3,255,573 A | 6/1966 | Cox, Jr. et al. |
| 3,288,448 A | 11/1966 | Patterson et al. |
| 3,321,890 A | 5/1967 | Barnhart |
| 3,347,019 A | 10/1967 | Barnhart |
| 3,360,127 A | 12/1967 | Wood, Jr. |
| 3,396,512 A | 8/1968 | McMinn et al. |
| 3,398,723 A | 8/1968 | Smalling |
| 3,407,052 A | 10/1968 | Huntress et al. |
| 3,528,758 A | 9/1970 | Perkins |
| 3,540,821 A | 11/1970 | Siegmund |
| 3,541,763 A | 11/1970 | Siegmund |
| 3,589,984 A | 6/1971 | Reid |
| 3,616,598 A * | 11/1971 | Foral, Jr. ............ 3/18 |
| 3,648,434 A | 3/1972 | Gravis, III et al. |
| 3,659,401 A | 5/1972 | Giammarco |
| 3,672,127 A | 6/1972 | Mayse et al. |
| 3,736,725 A | 6/1973 | Alleman et al. |
| 3,817,687 A | 6/1974 | Cavallero et al. |
| 3,829,521 A | 8/1974 | Green |
| 3,855,337 A | 12/1974 | Foral, Jr. et al. |
| 3,872,682 A | 3/1975 | Shook |
| 3,949,749 A | 4/1976 | Stewart |
| 3,989,487 A | 11/1976 | Peterson |
| 4,009,985 A | 3/1977 | Hirt |
| 4,010,009 A | 3/1977 | Moyer |
| 4,010,065 A | 3/1977 | Alleman |
| 4,058,147 A | 11/1977 | Stary et al. |
| 4,098,303 A | 7/1978 | Gammell |
| 4,108,618 A | 8/1978 | Schneider |
| 4,118,170 A | 10/1978 | Hirt |
| 4,134,271 A | 1/1979 | Datia |
| 4,162,145 A | 7/1979 | Alleman |
| 4,198,214 A | 4/1980 | Heath et al. |
| 4,270,938 A | 6/1981 | Schmidt et al. |
| 4,286,929 A | 9/1981 | Heath et al. |
| 4,305,895 A | 12/1981 | Heath et al. |
| 4,322,265 A * | 3/1982 | Wood ............ 159/47.3 |
| 4,332,643 A | 6/1982 | Reid |
| 4,342,572 A | 8/1982 | Heath |
| 4,362,462 A | 12/1982 | Blotenberg |
| 4,369,049 A | 1/1983 | Heath |
| 4,396,371 A | 8/1983 | Lorenz et al. |
| 4,402,652 A | 9/1983 | Gerlach et al. |
| 4,421,062 A | 12/1983 | Padilla, Sr. |
| 4,431,433 A | 2/1984 | Gerlach et al. |
| 4,435,196 A | 3/1984 | Pielkenrood |
| 4,459,098 A | 7/1984 | Turek et al. |
| 4,462,813 A | 7/1984 | May et al. |
| 4,474,549 A | 10/1984 | Capone |
| 4,474,550 A | 10/1984 | Heath et al. |
| 4,493,770 A | 1/1985 | Moilliet |
| 4,501,253 A | 2/1985 | Gerstmann et al. |
| 4,505,333 A * | 3/1985 | Ricks, Sr. ............ 166/267 |
| 4,511,374 A | 4/1985 | Heath |
| 4,539,023 A | 9/1985 | Boley |
| 4,568,268 A | 2/1986 | Gerlach et al. |
| 4,579,565 A | 4/1986 | Heath |
| 4,583,998 A | 4/1986 | Reid et al. |
| 4,588,372 A | 5/1986 | Torborg |
| 4,588,424 A | 5/1986 | Heath et al. |
| 4,597,733 A | 7/1986 | Dean et al. |
| 4,615,673 A | 10/1986 | Heath et al. |
| 4,617,030 A * | 10/1986 | Heath ............ 95/39 |
| 4,659,344 A | 4/1987 | Gerlach et al. |
| 4,674,446 A | 6/1987 | Padilla, Sr. |
| 4,676,806 A | 6/1987 | Dean et al. |
| 4,689,053 A | 8/1987 | Heath |
| 4,701,188 A * | 10/1987 | Mims ............ 95/18 |
| 4,715,808 A | 12/1987 | Heath et al. |
| 4,737,168 A | 4/1988 | Heath |
| 4,778,443 A | 10/1988 | Sands et al. |
| 4,780,115 A | 10/1988 | Ranke |
| 4,824,447 A | 4/1989 | Goldsberry |
| 4,830,580 A | 5/1989 | Hata et al. |
| 4,919,777 A | 4/1990 | Bull |
| 4,948,393 A | 8/1990 | Hodson et al. |
| 4,949,544 A | 8/1990 | Hines |
| 4,978,291 A | 12/1990 | Nakai |
| 4,983,364 A | 1/1991 | Buck et al. |
| 5,080,802 A | 1/1992 | Cairo, Jr. et al. |
| 5,084,074 A | 1/1992 | Beer et al. |
| 5,129,925 A | 7/1992 | Marsala et al. |
| 5,130,078 A | 7/1992 | Dillman |
| 5,132,011 A | 7/1992 | Ferris |
| 5,163,981 A * | 11/1992 | Choi ............ 95/209 |
| 5,167,675 A * | 12/1992 | Rhodes ............ 95/156 |
| 5,191,990 A | 3/1993 | Fritts |
| 5,195,587 A | 3/1993 | Webb |
| 5,209,762 A | 5/1993 | Lowell |
| 5,249,739 A | 10/1993 | Bartels et al. |
| 5,269,886 A * | 12/1993 | Brigham, Sr. ............ 202/176 |
| 5,346,537 A * | 9/1994 | Lowell ............ 95/161 |
| 5,377,723 A | 1/1995 | Hilliard |
| 5,419,299 A | 5/1995 | Fukasawa et al. |
| 5,453,114 A * | 9/1995 | Ebeling ............ 95/166 |
| 5,476,126 A | 12/1995 | Hilliard et al. |
| 5,490,873 A | 2/1996 | Behrens et al. |
| 5,501,253 A | 3/1996 | Weiss |
| 5,513,680 A | 5/1996 | Hilliard et al. |
| 5,536,303 A | 7/1996 | Ebeling |
| 5,571,310 A | 11/1996 | Nanaji |
| 5,579,740 A | 12/1996 | Cotton et al. |
| 5,664,144 A | 9/1997 | Yanai et al. |
| 5,665,144 A * | 9/1997 | Hill et al. ............ 95/179 |
| 5,678,411 A | 10/1997 | Matsumura et al. |
| 5,755,854 A | 5/1998 | Nanaji |
| 5,766,423 A * | 6/1998 | Smith ............ 203/12 |
| 5,826,433 A | 10/1998 | Dube |
| 5,857,616 A | 1/1999 | Karnoff et al. |
| 5,878,725 A | 3/1999 | Osterbrink |
| 5,882,486 A * | 3/1999 | Moore, Jr. ............ 203/87 |
| 5,885,060 A | 3/1999 | Cunkelman et al. |
| 5,988,232 A | 11/1999 | Koch et al. |
| 6,004,380 A * | 12/1999 | Landreau et al. ............ 95/174 |
| 6,010,674 A | 1/2000 | Miles et al. |
| 6,023,003 A | 2/2000 | Dunning et al. |
| 6,027,311 A | 2/2000 | Hill et al. |
| 6,095,793 A | 8/2000 | Greeb |
| 6,142,191 A | 11/2000 | Sutton et al. |
| 6,183,540 B1 | 2/2001 | Thonsgaard |
| 6,193,500 B1 | 2/2001 | Bradt et al. |
| 6,223,789 B1 | 5/2001 | Koch |
| 6,224,369 B1 | 5/2001 | Moneyhun |
| 6,238,461 B1 | 5/2001 | Heath |
| 6,251,166 B1 * | 6/2001 | Anderson ............ 95/166 |
| 6,273,937 B1 | 8/2001 | Schucker |
| 6,299,671 B1 * | 10/2001 | Christensen ............ 95/166 |
| 6,314,981 B1 | 11/2001 | Mayzou et al. |
| 6,332,408 B2 | 12/2001 | Howlett |
| 6,363,744 B2 | 4/2002 | Finn et al. |
| 6,364,933 B1 | 4/2002 | Heath |
| 6,425,942 B1 * | 7/2002 | Forster ............ 95/174 |
| 6,461,413 B1 * | 10/2002 | Landreau et al. ............ 95/161 |
| 6,478,576 B1 | 11/2002 | Bradt et al. |
| 6,499,476 B1 | 12/2002 | Reddy |
| 6,532,999 B2 | 3/2003 | Pope et al. |
| 6,533,574 B1 | 3/2003 | Pechoux |
| 6,537,349 B2 | 3/2003 | Choi et al. |
| 6,537,458 B1 | 3/2003 | Polderman |
| 6,551,379 B2 | 4/2003 | Heath |

(56) References Cited

U.S. PATENT DOCUMENTS

| | | |
|---|---|---|
| 6,604,558 B2 | 8/2003 | Sauer |
| 6,616,731 B1 | 9/2003 | Hillstrom |
| 6,719,824 B1 | 4/2004 | Bowser |
| 6,745,576 B1 | 6/2004 | Granger |
| 6,931,919 B2 | 8/2005 | Weldon |
| 6,984,257 B2 | 1/2006 | Heath et al. |
| 7,005,057 B1 * | 2/2006 | Kalnes ............... 208/97 |
| 7,025,084 B2 | 4/2006 | Perry et al. |
| 7,131,265 B2 | 11/2006 | Lechner |
| RE39,944 E | 12/2007 | Heath |
| 7,350,581 B2 | 4/2008 | Wynn |
| 7,481,237 B2 | 1/2009 | Jones et al. |
| 7,497,180 B2 | 3/2009 | Karlsson et al. |
| 7,531,030 B2 | 5/2009 | Heath et al. |
| 7,575,672 B1 * | 8/2009 | Gilmore .................. 210/117 |
| 7,905,722 B1 | 3/2011 | Heath et al. |
| 8,529,215 B2 | 9/2013 | Heath et al. |
| 2001/0008073 A1 | 7/2001 | Finn et al. |
| 2002/0073843 A1 | 6/2002 | Heath |
| 2002/0081213 A1 | 6/2002 | Takahashi et al. |
| 2002/0178918 A1 * | 12/2002 | Lecomte et al. ............ 95/174 |
| 2002/0185006 A1 * | 12/2002 | Lecomte et al. ............ 95/231 |
| 2003/0005823 A1 | 1/2003 | Le Blanc et al. |
| 2003/0167690 A1 | 9/2003 | Edlund et al. |
| 2004/0031389 A1 * | 2/2004 | Heath et al. .................. 95/193 |
| 2004/0186630 A1 | 9/2004 | Shier et al. |
| 2004/0211192 A1 | 10/2004 | Lechner |
| 2005/0115248 A1 | 6/2005 | Koehler et al. |
| 2005/0266362 A1 | 12/2005 | Stone et al. |
| 2006/0144080 A1 | 7/2006 | Heath et al. |
| 2006/0156744 A1 | 7/2006 | Cusiter et al. |
| 2006/0156758 A1 | 7/2006 | An et al. |
| 2006/0218900 A1 | 10/2006 | Lechner |
| 2006/0254777 A1 | 11/2006 | Wynn |
| 2006/0260468 A1 * | 11/2006 | Amin ...................... 95/153 |
| 2007/0051114 A1 | 3/2007 | Mahlanen |
| 2007/0084341 A1 | 4/2007 | Heath et al. |
| 2007/0151292 A1 | 7/2007 | Heath et al. |
| 2007/0175226 A1 | 8/2007 | Karlsson et al. |
| 2007/0186770 A1 * | 8/2007 | Heath et al. .................. 95/179 |
| 2007/0199696 A1 * | 8/2007 | Walford .................. 166/250.01 |
| 2008/0008602 A1 | 1/2008 | Pozivil et al. |
| 2008/0120993 A1 | 5/2008 | An et al. |
| 2009/0133578 A1 | 5/2009 | Brasa et al. |
| 2009/0223246 A1 * | 9/2009 | Heath et al. ..................... 62/618 |
| 2010/0040989 A1 | 2/2010 | Heath et al. |
| 2012/0261092 A1 | 10/2012 | Heath et al. |
| 2013/0319844 A1 | 12/2013 | Heath et al. |

FOREIGN PATENT DOCUMENTS

| | | |
|---|---|---|
| CA | 2281610 | 9/1998 |
| CA | 2426071 | 10/2003 |
| CA | 2224389 | 2/2008 |
| CA | 2311440 | 6/2011 |
| CA | 2563747 | 5/2013 |
| FR | 2542039 | 9/1984 |
| GB | 370591 | 4/1932 |
| GB | 573819 | 12/1945 |
| JP | 58185990 | 10/1983 |
| RU | 2159913 | 11/2000 |
| SU | 1021809 | 6/1983 |
| SU | 1801092 | 3/1993 |
| WO | 2005/068847 | 7/2005 |
| WO | WO 2010080040 A1 * | 7/2010 ............ F04D 31/00 |
| WO | 2013/170190 | 11/2013 |

OTHER PUBLICATIONS

"Natural Gas Dehydration", The Environmental Technology Verification Program, Sep. 2003.

Archer, Phil, "TEG Regenerator Vapor Recovery in Amoco's Northwestern Business Unit", Amoco Northwestern Business Unit, Aug. 1992.

Reid, Laurance S., "Coldfinger An Exhauster for Removing Trace Quantities of Water from Glycol Solutions Used for Gas Dehydration", Ball-Reid Engineers, Inc., Oklahoma City, Oklahoma, 1975, 592-602.

* cited by examiner

HIGH EFFICIENCY SLUG CONTAINING VAPOR RECOVERY

CROSS-REFERENCE TO RELATED APPLICATIONS

This application claims priority to and the benefit of the filing of U.S. Provisional Patent Application Ser. No. 61/388,468, entitled "High Efficiency Slug Containing Vapor Recovery", filed on Sep. 30, 2010, and the specification thereof is incorporated herein by reference.

BACKGROUND OF THE INVENTION

Field of the Invention

Technical Field

Embodiments of the present invention provide a vapor recovery system for a hydrocarbon well. Particularly, embodiments of the present invention a vapor recovery system which is capable of handling large slugs of liquids without inducing large recycle loops thereby permitting the use of a relatively small compressor

BRIEF SUMMARY OF EMBODIMENTS OF THE PRESENT INVENTION

An embodiment of the present invention relates to a slug-containing vapor recovery system having a first flow of hydrocarbon vapors in fluid communication with a first pressure sensor, the hydrocarbon vapors traveling to an inlet scrubber; allowing a flow of liquid hydrocarbons to flow from a flash separator and be heated into a vapor before joining the first flow of hydrocarbon vapors; and reducing the flow of liquid hydrocarbons from the flash separator when the first pressure sensor senses a pressure in excess of a predetermined amount. Optionally, reducing the flow of liquid hydrocarbons can include stopping the flow of liquid hydrocarbons from the flash separator. Heating the flow of liquid hydrocarbons into a vapor can include heating the flow of liquid hydrocarbons with a heat exchanger.

In one embodiment, the heat exchanger is disposed within a two-phase stabilizing reboiler, and the stabilizing reboiler can be heated by a firetube. The system can also include providing a two-phase, slug-containing flash separator, which itself can have a gas expansion vessel communicably coupled to it. The gas expansion vessel can be in fluid communication with a well-stream inlet separator. The gas expansion vessel can allow the pressure of contents therein to increase due to the arrival of a slug of liquid hydrocarbons.

An embodiment of the present invention also relates to a slug-containing vapor recovery system having a gas expansion vessel communicably coupled to receive an incoming flow of hydrocarbons from a well-stream inlet, a two-phase, slug-containing flash separator in fluid communication with the gas expansion vessel, a first pressure sensor sensing a pressure of contents of the gas expansion vessel, and operating a compressor which compresses hydrocarbon vapors, the compressor operating at a first speed when pressure sensed by the first pressure sensor is less than a first predetermined amount and the compressor operating at a second speed when pressure sensed by the first pressure sensor is greater than the first predetermined amount, the first speed being less than the second speed.

The system can divert the incoming flow of hydrocarbons to bypass at least a portion of the system when the first pressure sensor senses a pressure which is greater than a second predetermined amount. The system can optionally divert the incoming flow of hydrocarbons such that they travel from the existing well-stream inlet separator into a hydrocarbon storage tank.

Optionally, the system can also include: providing a second pressure sensor in fluid communication with a first flow of hydrocarbon vapors traveling to an inlet scrubber; allowing a flow of liquid hydrocarbons to flow from a flash separator and be heated into a vapor before joining the first flow of hydrocarbon vapors; and/or reducing the flow of liquid hydrocarbons from the flash separator when the first pressure sensor senses a pressure in excess of a predetermined amount. The gas expansion vessel can include a liquid level switch. The incoming flow of hydrocarbons can be diverted around at least a portion of the system in response to the detection of a liquid by the liquid level switch. Optionally, the incoming flow of hydrocarbons can be diverted around at least a portion of the system for a predetermined amount of time, which can optionally include diverting the incoming flow of hydrocarbons into a hydrocarbon storage tank, which itself can optionally have a volume of at least 200 barrels.

An embodiment of the present invention also relates to a slug-containing vapor recovery apparatus having a first hydrocarbon vapors passageway, the passageway in fluid communication with a first pressure sensor, the first hydrocarbon vapors passageway communicable with an inlet scrubber, a liquid hydrocarbon vaporizing heater, the vaporizing heater communicably coupled to a condensate outlet of a flash separator and the vaporizing heater communicably coupled to the first hydrocarbon vapors passageway, and an apparatus capable of reducing a flow of liquid hydrocarbons from the flash separator when the first pressure sensor senses a pressure in excess of a first predetermined amount.

Optionally, a diverting valve can be activated in response to the first pressure sensor sensing a pressure which is in excess of a second predetermined amount. In one embodiment, the diverting valve can be communicably coupleable to an outlet of a hydrocarbon producing well and to an inlet of a hydrocarbon storage tank.

An embodiment of the present invention also relates to a slug-containing vapor recovery apparatus having a gas expansion vessel communicably coupleable to an outlet of a hydrocarbon-producing well, a two-phase slug-containing flash separator in fluid communication with the gas expansion vessel, a first pressure sensor, the first pressure sensor positioned to sense a pressure of contents of the gas expansion vessel, and an at least two speed compressor, the compressor communicably coupled to an outlet of a first stage inlet scrubber, the compressor selectively speed controlled based on an output of the first pressure sensor. The compressor can be caused to operate at a speed which is faster when the pressure sensor detects a pressure that is in excess of a predetermined amount, as compared with the speed of the compressor when the sensor detects a pressure that is below the predetermined amount. Optionally, the apparatus can also include a liquid level switch positioned to detect a liquid level within the gas expansion vessel.

In one embodiment, a diverting valve can be activated in response to a sensed liquid level by the liquid level switch. The diverting valve can be communicably coupleable to an outlet of a hydrocarbon producing well and to an inlet of a hydrocarbon storage tank.

An embodiment of the present invention also relates to a slug-containing vapor recovery apparatus having a compressor, a reboiler, and a gas expansion vessel, the gas expansion vessel allowing the pressure of a hydrocarbon gas to increase upon receipt of an incoming hydrocarbon slug, thereby increasing a gas storage capacity of the gas expansion vessel, the vapor recovery apparatus configured such that if the pressure of the gas in the gas expansion vessel reaches a predetermined set point a pressure control process of the vapor recovery apparatus causes the dumping of liquid hydrocarbons into the reboiler to cease, thus allowing the additional capacity of the compressor to be applied to reducing the pressure of the gas in the gas expansion vessel.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1A:
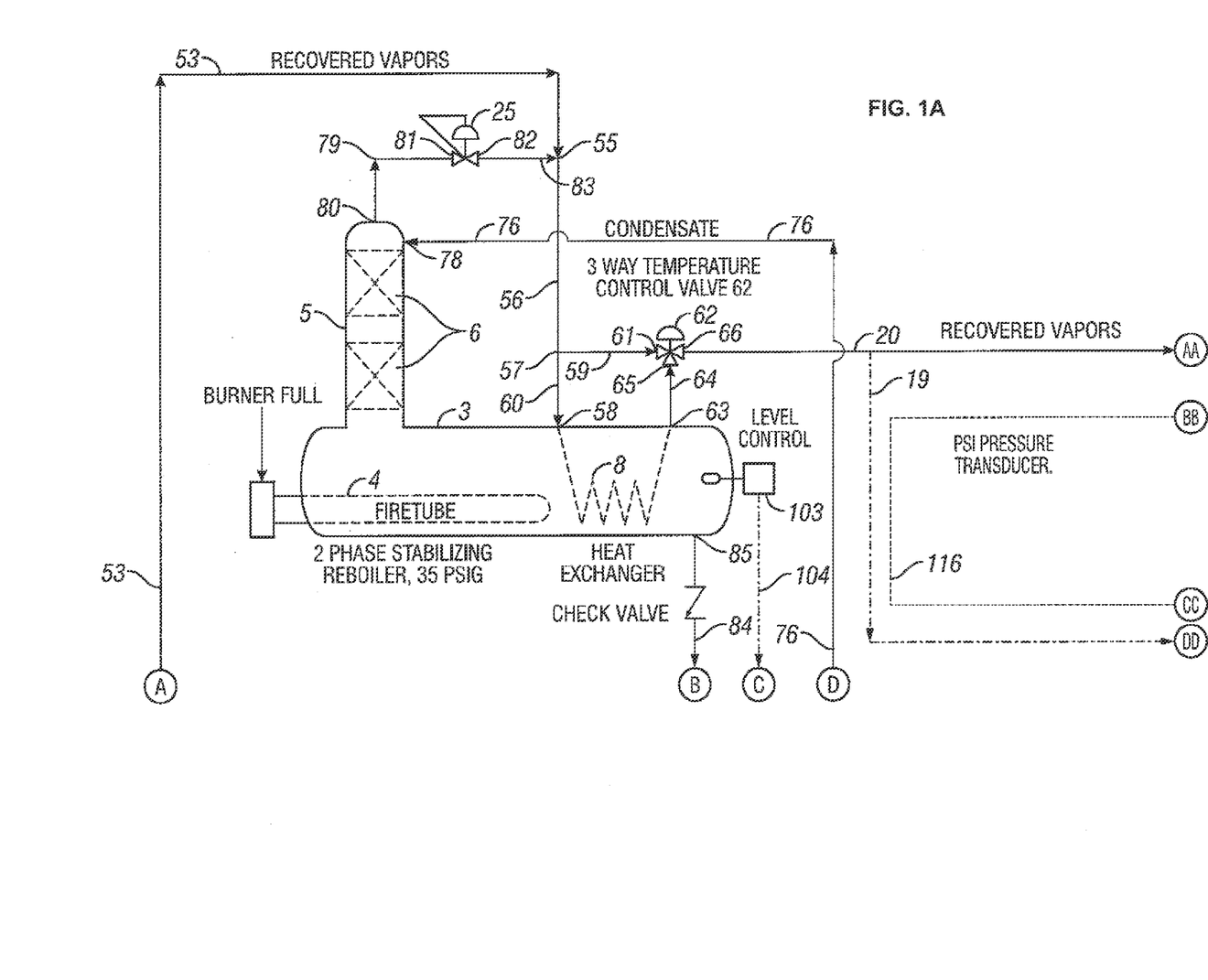
FIGS. 1A-D (hereinafter referred to as "FIG. 1") illustrate a schematic diagram of an embodiment of the present invention in use with a 2-stage compressor.
Figure 1B:
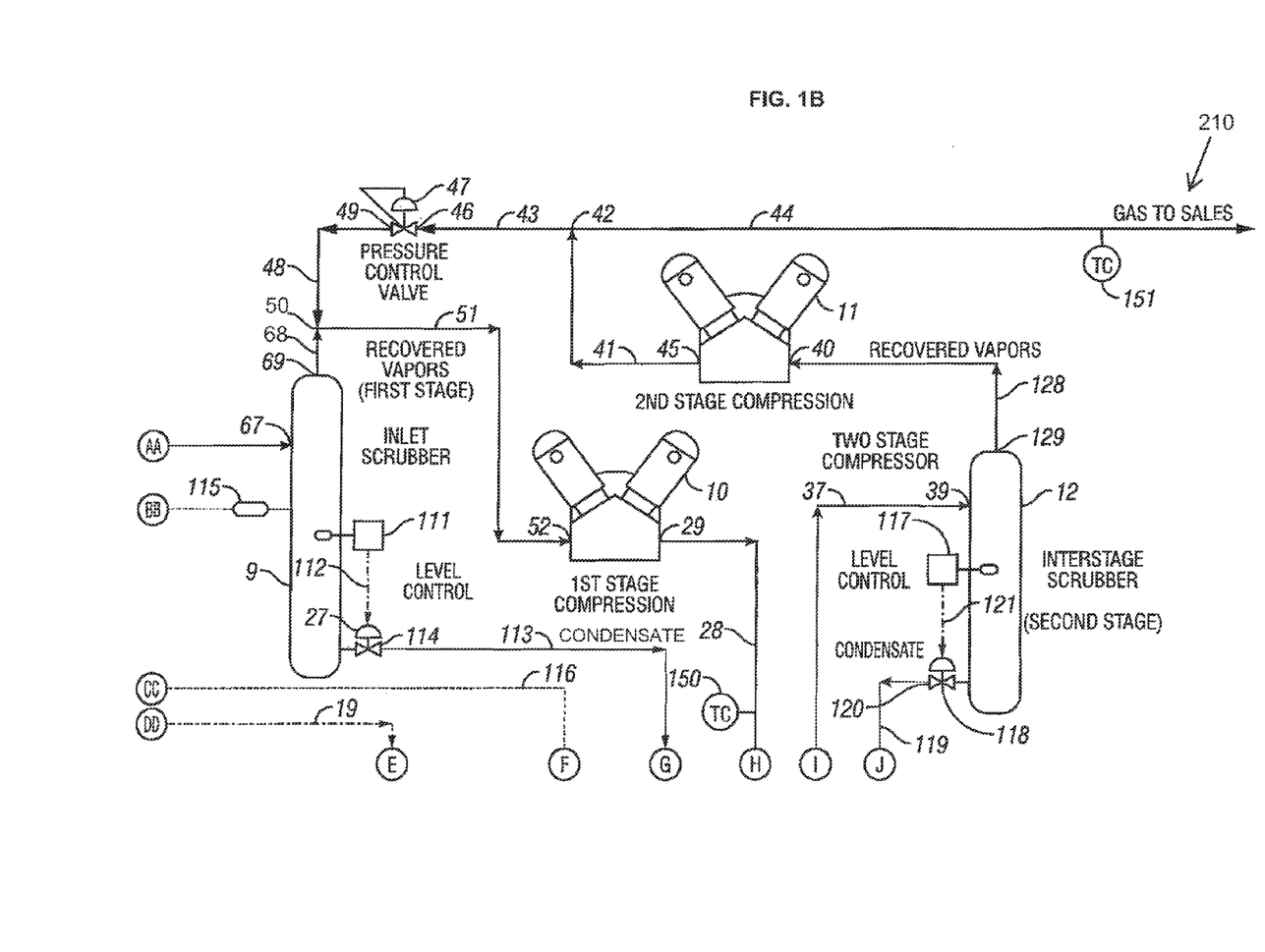
Figure 1C:
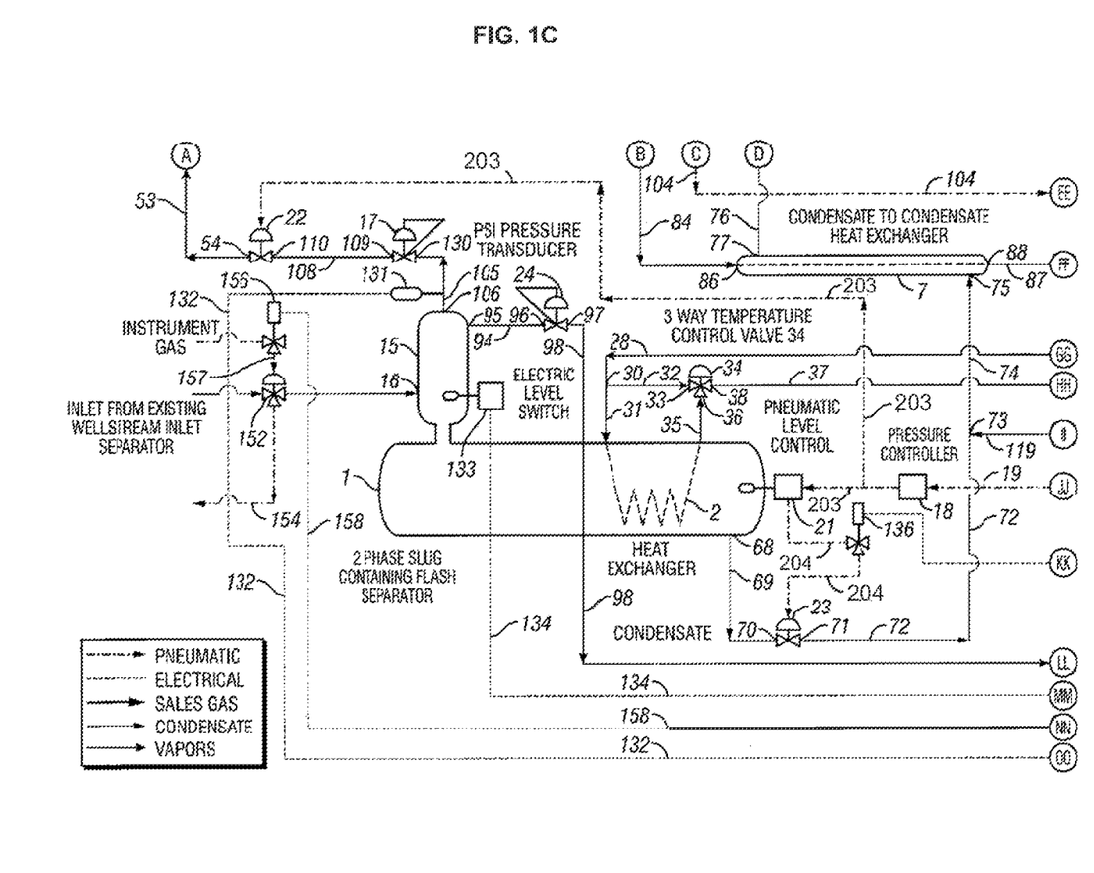
Figure 1D:
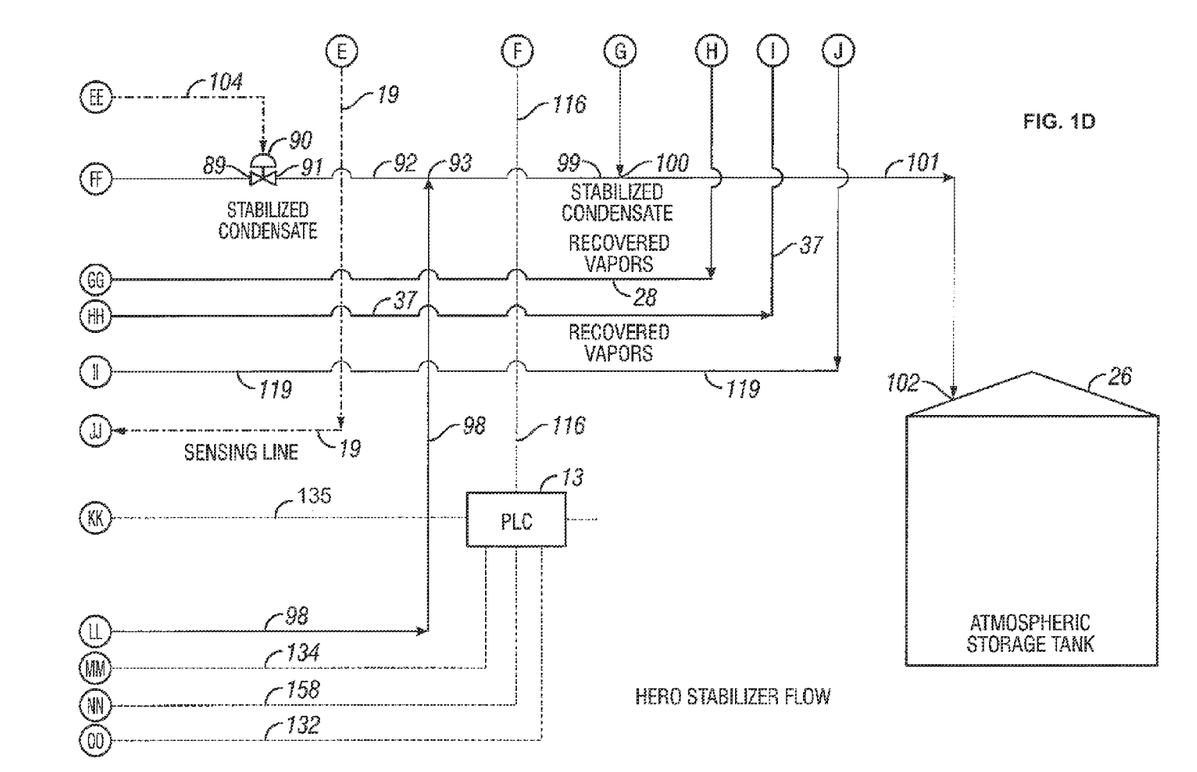

An embodiment of the present invention relates to a high efficiency slug containing vapor recovery system. Referring now to FIG. 1, a flow diagram for a two-stage compressor embodiment of the present invention is illustrated. The system of the present invention can optionally be powered by an internal combustion engine an electric motor, other power means or a combination thereof. Although the components of the present invention can be selected so as to handle virtually any pressure, in one embodiment, the system is constructed to handle a maximum discharge pressure of about 400 psig. For applications requiring higher discharge pressures, a compressor with three or more stages can be used and will produce desirable results. Because of higher discharge pressures, the amount of heat generated by three stages or more of compression will be greater than the amount of heat generated by a two stages of compression. On some high pressure applications, atmospheric cooling can optionally be used to cool parts of the process, particularly those which generate very high temperatures. For embodiments of the present invention which are used with several stages of compression, additional compression temperature control is preferably provided for each additional stage of compression.

As illustrated in FIG. 1, flash separator vessel 1, is a two phase slug containing flash separator which performs the functions of a flash separator and a liquid slug containment vessel. In one embodiment, vessel 1 can have a maximum working pressure of about 175 to about 250 psig. Vessel 1 preferably retains enough liquids to at least partially, and most preferably fully immerse cooling coil 2. While desirable results can be provided when vessel 1 is a two-phase slug containing flash separator, desirable results can also be produced when vessel 1 is configured as a three-phase slug containing flash separator. Reboiler 3 can be selected to have a maximum working pressure for any given site-location requirements, but in one embodiment, reboiler 3 preferably has a maximum working pressure of about 75 to about 125 psig. Firetube 4 is preferably immersed in the condensates in reboiler 3. In one embodiment, reboiler 3 preferably heats, under about 35 psig pressure, liquid condensates to a temperature of about 200 to 250 degrees Fahrenheit. Stabilizing column 5 is preferably mounted on top of and in communication with reboiler 3. Stabilizing column 5 can be filled with pall rings 6 or other types of packing. Stabilizing column 5 preferably performs two functions. First, it aids in stripping high vapor pressure components such as propane, butane, etc., from the condensate. As the condensate falls through the packing, it is heated by the rising heated vapors from reboiler 3. Heating of the condensate preferably causes some of the high vapor components of the condensate to flash into the vapor phase. Second, stabilizing column 5 preferably aids in refluxing back into the liquid phase some of the lower vapor pressure components of the heated vapors from reboiler 3. As the heated vapors from reboiler 3 rise through the cooler condensate, the heated vapors are cooled while forming gas bubbles within the condensate. Cooling and intimate contact of the heated vapors with the condensate causes some of the lower vapor pressure components of the heated vapors to return to the liquid phase.

While flowing through heat exchanger 7, the cool condensate from vessel 1 is preferably heated and the hot condensate from reboiler 3 is preferably simultaneously cooled. Heating coil 8 is preferably immersed in the hot liquids contained in reboiler 3. Inlet suction scrubber 9 preferably collects and dumps, through dump valve 27 to liquid hydrocarbon storage tank 26, any liquid that might condense from the collected vapors so that only hydrocarbon vapors are introduced into the compressor. In one embodiment liquid hydrocarbon storage tank 26 preferably has a capacity of at least about 10 barrels, more preferably a capacity of at least about 200 barrels, and most preferably a capacity of at least about 400 barrels.

First and second stages 10 and 11 are two stages of a two-stage compressor. Interstage scrubber 12 is preferably located between an outlet of compression stage 10 and an inlet of compression stage 11. Various functions of the system of the present invention are preferably controlled, at least in part via PCL (process logic controller) 13. Condensates separated from the well stream by the high pressure separator or separators enter gas expansion vessel 15 at inlet 16. Since flash separator 1 and gas expansion vessel 15 are preferably at a lower pressure than the entering well stream, some entrained gas as well as some vapors will flash from the condensate. In one embodiment, back pressure valve 17 is set to hold an operating pressure of about 50 psig on gas expansion vessel 15 and flash separator 1. In one embodiment, back pressure valve 24 is set to hold a pressure that is about 20 psig less than the lowest operating pressure of the high pressure separators (not shown); or else, back pressure regulator 24 is set slightly below the maximum working pressure of flash separator 1 and gas expansion vessel 15.

Referring to first stage of compression 10, 28 is a flow line that connects gas discharge port 29 of first stage compression 10 to point 30. At point 30, line 28 splits into lines 31 and 32. Line 31 connects to cooling coil 2. Line 32 connects to bypass port 33 of temperature control valve 34. Outlet 35 of cooling coil 2 preferably connects to cooled gas port 36 of temperature control valve 34. Line 37 connects outlet port 38 of temperature control valve 34 to inlet port 39 of interstage scrubber 12.

In one embodiment, line 128 connects outlet port 129 of interstage scrubber 12 to suction port 40 of second compression stage 11. Line 41 preferably connects discharge port 45 of second compression stage 11 to point 42. Point 42 splits into two lines 43 and 44. Line 44 carries the collected hydrocarbon vapors to the sales meter/sales 210. Line 43 connects to inlet port 46 of gas recycle pressure control valve 47.

Line 48 connects discharge 49 of recycle valve 47 to point 50. Point 50 splits into lines 51 and 68. Line 51 carries the collected vapors, as well as any recycled vapors required for operation of the compressor, to suction port 52 of first stage of compression 10.

Referring to gas expansion vessel 15, line 94 connects from outlet port 95 of gas expansion vessel 15 to inlet port 96 of back pressure valve 24. Line 98 connects from outlet port 97 of back pressure valve 24 to point 93. Point 93 splits into two lines 92 and 99. Line 105 connects to vapor outlet port 106 of expansion vessel 15 to inlet port 130 of back pressure valve 17. Line 108 connects from outlet port 109 of back pressure valve 17 to inlet port 110 of pressure control valve 22. Line 132 connects pressure transducer 131 to PLC 13. Line 134 connects electric liquid level control 133 to PLC 13.

Referring to flash separator 1 and reboiler 3, line 69 connects condensate outlet port 68 of flash separator 1 to inlet port 70 of condensate dump valve 23. Line 72 connects from condensate dump valve outlet port 71 to point 73. Point 73 splits into two lines 74 and 119. Line 74 connects from point 73 to cool condensate inlet port 75 of condensate to condensate heat exchanger 7. Line 76 connects from heated outlet port 77 of condensate to condensate heat exchanger 7 to condensate inlet port 78 of stabilizing column 5. Line 79 connects from vapor outlet port 80 of stabilizing column 5 to inlet port 81 of back pressure valve 25. In one embodiment, back pressure valve 25 is set to hold a pressure of about 35 to 45 psig on reboiler 3. Line 83 connects from outlet port 82 of back pressure valve 25 to point 55. Point 55 splits into lines 53 and 56. Line 53 connects outlet port 54 of pressure control valve 22 to point 55. Line 56 connects point 55 to point 57. Point 57 splits into two lines 60 and 59. Line 60 connects point 57 to the inlet 58 of heating coil 8. Line 59 connects point 57 to bypass port 61 of temperature control valve 62. Line 64 connects outlet port 63 of heating coil 8 to hot gas port 65 of temperature control valve 62. Line 20 connects outlet port 66 of temperature control valve 62 to inlet port 67 of inlet scrubber 9. Line 68 connects vapor outlet port 69 of inlet scrubber 9 to point 50. Point 50 splits into lines 48 and 51. Line 48 connects outlet port 49 of recycle valve 47 to point 50. Line 51 connects point 50 to suction port 52 of first stage of compression 10.

Reboiler 3 is preferably adjusted via condensate liquid level control 103. Line 104 is a tubing line that sends a pressure signal from liquid level control 103 to liquid dump valve 90. Line 84 connects from hot condensate outlet port 85 of reboiler 3 to hot liquid inlet port 86 of condensate to condensate heat exchanger 7. Line 87 connects from cooled condensate outlet port 88 of condensate to condensate heat exchanger 7 to inlet port 89 of cooled condensate dump valve 90. Line 92 connects from outlet port 91 of cooled condensate dump valve 90 to point 93. At point 93 the lines split to form lines 98 and 99. Line 99 connects from point 93 to point 100. At point 100 the line splits to form lines 101 and 113. Line 101 connects from point 100 to inlet 102 of storage tank 26. Line 113 connects from outlet port 114 of dump valve 27 to point 100.

Inlet scrubber 9 is preferably adjusted via liquid level control 111. Line 112 is preferably formed from tubing and carries a pneumatic signal to dump valve 27. Line 113 connects from outlet port 114 of dump valve 27 to point 100. Electrical line 116 transmits an electrical signal from transducer 115 to PLC 13.

Interstage scrubber 12 is preferably adjusted with liquid level control 117. Line 119 connects outlet port 120 of dump valve 118 to point 73. Tubing line 121 carries a pneumatic control signal from liquid level control 117 to dump valve 118.

As used throughout this application, a reference to "normal operation" is intended to mean that the present invention is operating within the normal design capacity without the influence of a large slug of produced liquids and/or liquids and gases; whereas "abnormal" or "upset conditions" means that the present invention is operating under the influence of a slug of produced liquids and/or liquids and gases, which could exceed the capacity of the present invention, particularly the reboiler and compressor. Such abnormal conditions can be caused by arrival of a slug into flash separator 1 and gas expansion vessel 15.

Figure 2A:
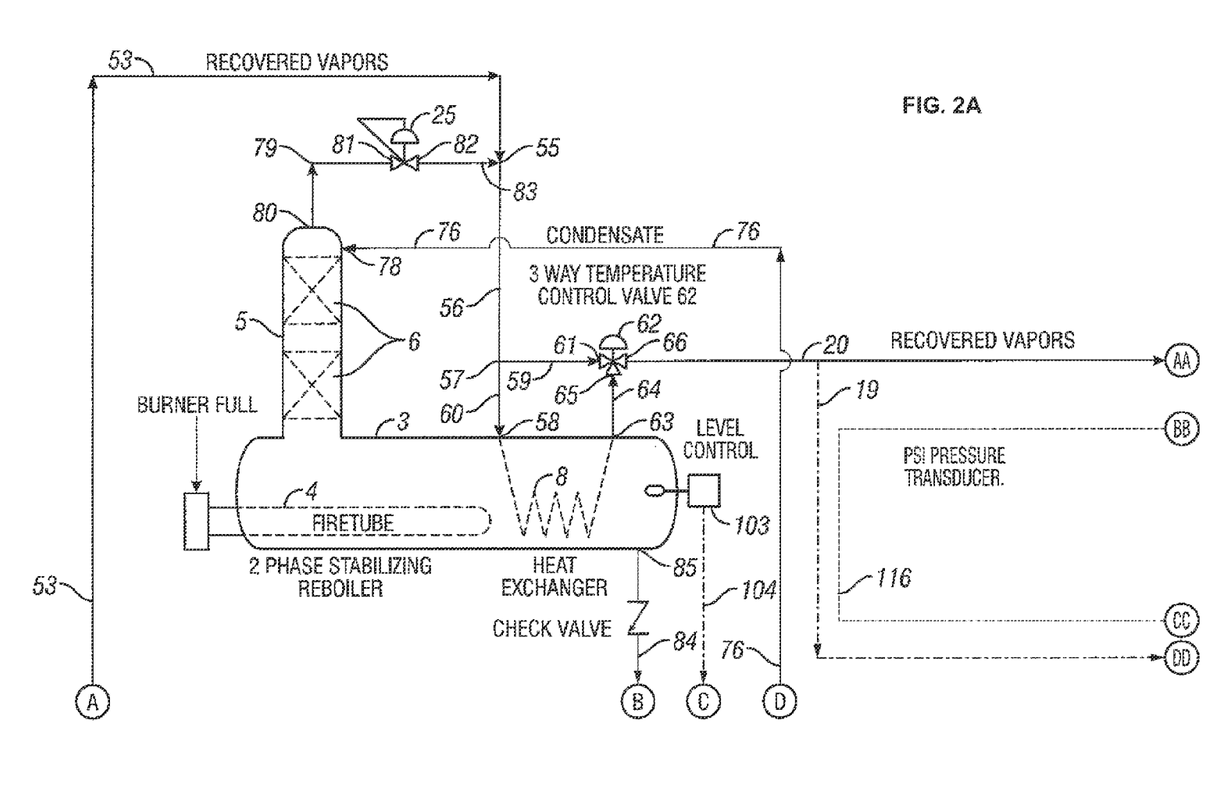
FIGS. 2A-D (hereinafter referred to as "FIG. 2") illustrate a schematic diagram of an embodiment of the present invention in use with a 3-stage compressor.
Figure 2B:
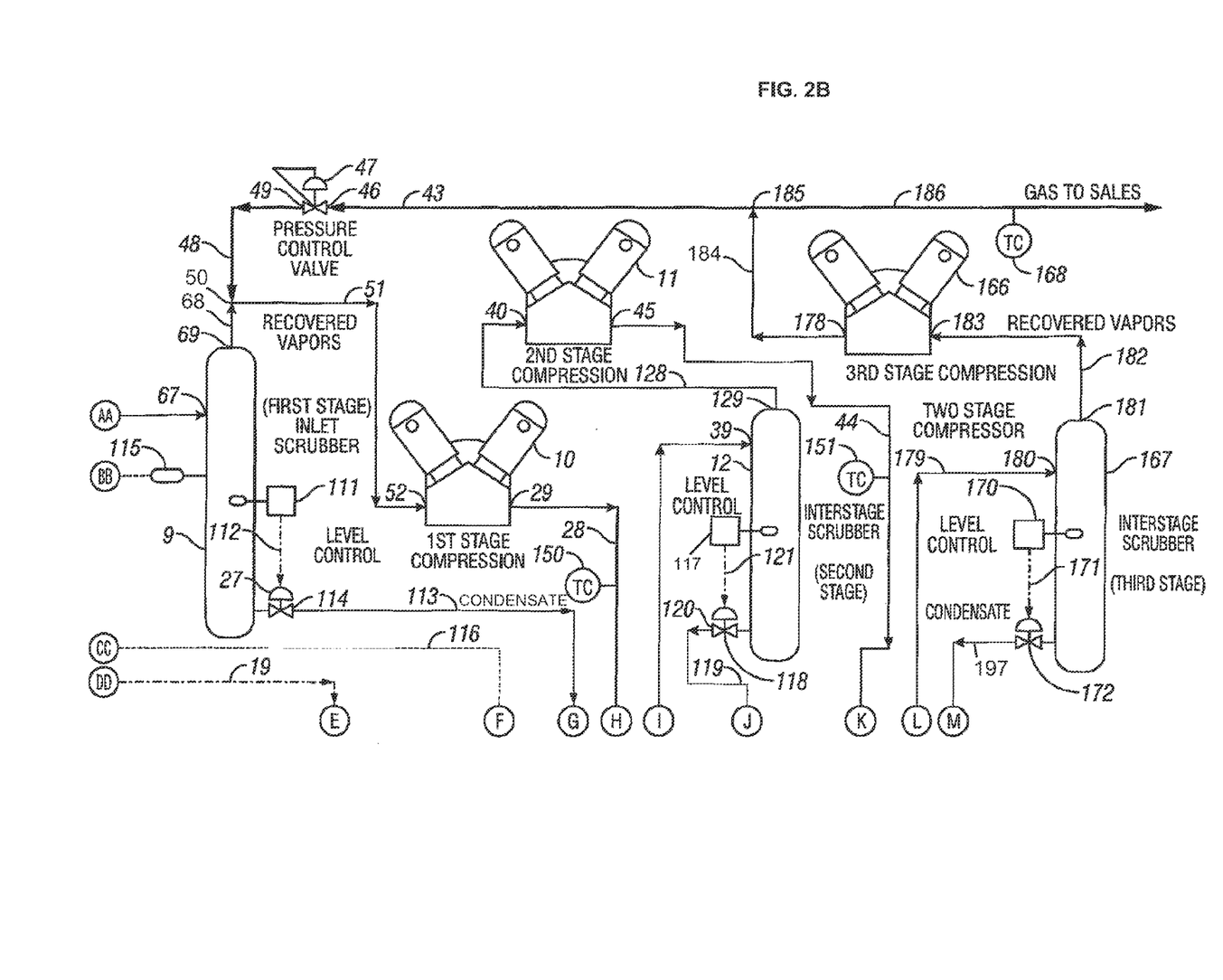
Figure 2C:
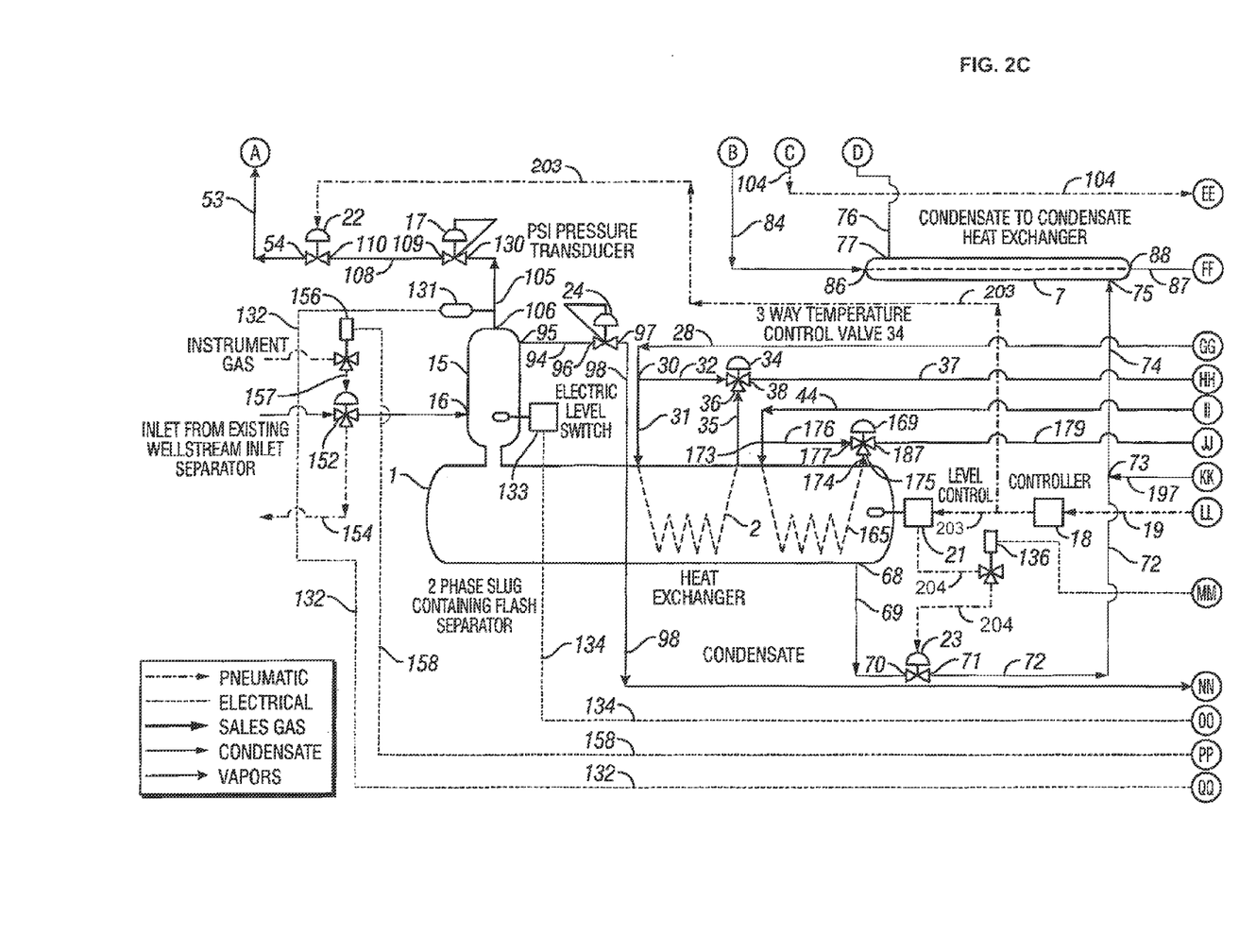
Figure 2D:
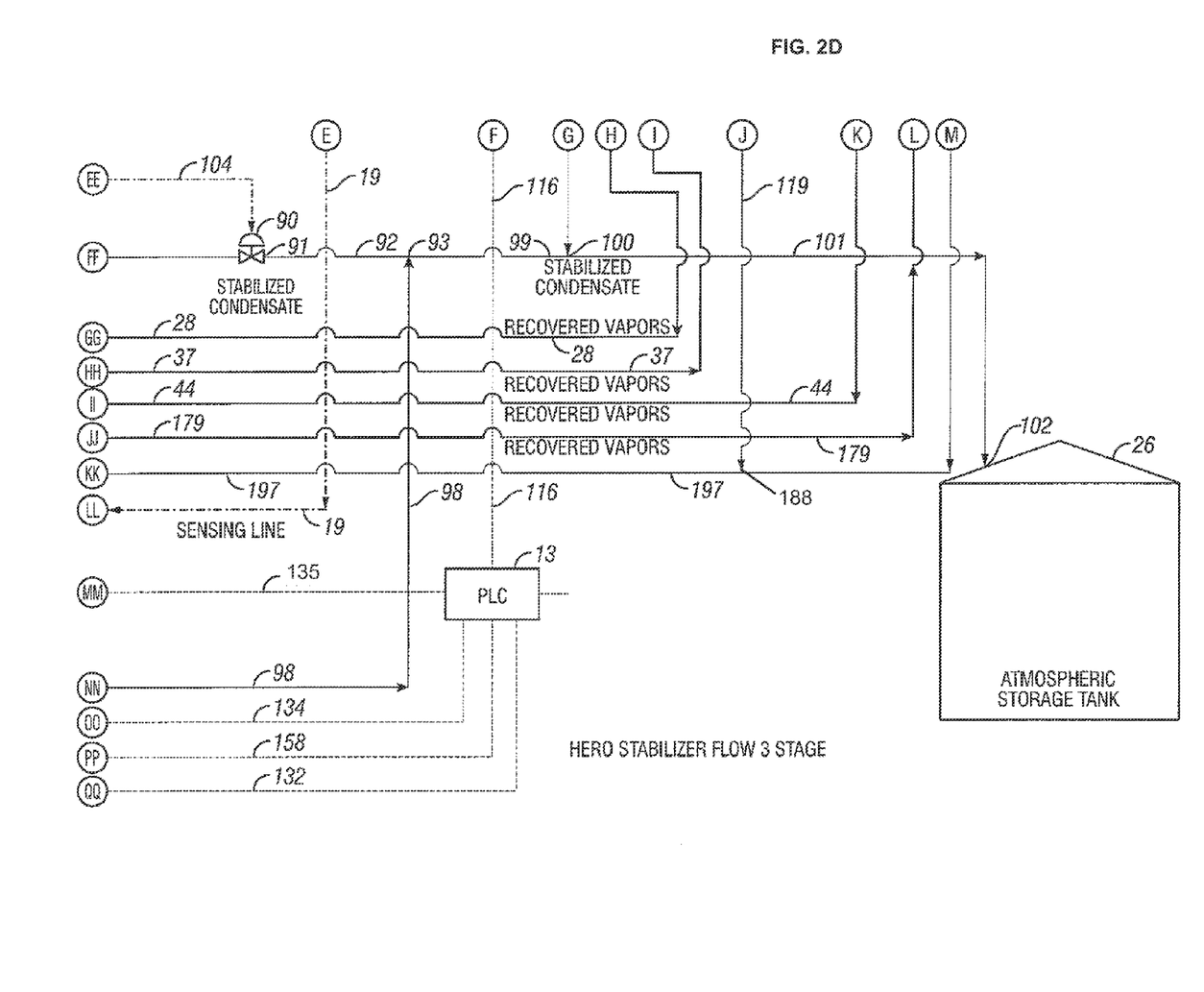

In embodiments of the present invention wherein three stages of compression are required for a particular application, the preceding description is equally applicable in conjunction with the following discussion regarding this additional third stage. Referring to FIG. 2, liquids collected in inner-stage scrubber 167 are dumped by liquid level control 170 and dump valve 172 through line 197 to point 73. At point 188, the liquids from inner-stage scrubbers 12 and 167 flow through common line 119 to point 73. Additional stages of compression, such as four or five stages of compression can optionally be used in accordance with the teachings of the present invention simply by duplicating the configuration of this third stage of compression.

Handling of Liquids Under Normal Operation

Condensates from the high pressure separator or separators enter gas expansion vessel 15 at point 16. The condensates flow downward into flash separator 1 and the gas and vapors collect in the top of gas expansion vessel 15. As previously described, flash separator 1 is designed to maintain a hydrocarbon liquid level that is most preferably above cooling coil 2. Any volume of liquid hydrocarbons in excess of that required to maintain the minimum liquid level in separator 1 is sensed by liquid level control 21 and dumped to stabilizing column 5. While being dumped to stabilizing column 5, the condensates are heated by heat exchanger 7. The heated condensates pass downward through the packing 6 in stabilizing column 5 and mix with the heated condensate already in reboiler 3. The condensates entering reboiler 3 are heated by firetube 4 to a high enough temperature to vaporize the volatile components such as butane, propane, etc which were previously condensed into liquid form. Any other suitable source of heat such as hot oil, electric heaters, and/or captured waste heat may be used in place of firetube 4.

The level of condensates in reboiler 3 are preferably maintained by liquid level control 103. When liquid level control 103 senses an increase in condensate level in reboiler 3, it activates through tubing line 104 and dump valve 90 to dump the stabilized condensate to storage tank 26. While being dumped to storage tank 26 the hot stabilized condensate is cooled in heat exchanger 7 by the cool condensate from flash separator 1.

Handling of Liquids Under Abnormal Operation.

As previously described, in some instances, the condensates entering flash separator 1 and gas expansion vessel 15 can arrive suddenly in the form of a large slug of produced liquids and/or liquids and gases. The increased volume of condensates increases the volume of flashed gases and hydrocarbon vapors being released in flash separator 1, gas expansion vessel 15, and reboiler 3. The increased volume of flash gases causes the pressure in line 20, which carries the flash gases to inlet scrubber 9, to increase. During slugging conditions the condensate level in flash separator 1 is above the operating level of throttling liquid level control 21, causing liquid level control 21 to begin completely opening dump valve 23. Increased opening of dump valve 23 increases the flow of condensates to reboiler 3, thereby causing an overload of condensate and vapors in reboiler 3.

Pressure controller 18 monitors through sensing line 19 the pressure in line 20. Tubing line 203 carries the pressure signal from pressure controller 18 to pressure control valve 22 and liquid Level control 21. When solenoid 136 is not activated, tubing line 204 carries a pneumatic signal from liquid level control 21 to dump valve 23. Pressure controller 18 controls the supply pressure going to liquid level controller 21 and pressure control valve 22. In one embodiment, pressure controller 18 is set to maintain a predetermined set pressure, which can optionally be about 40 psig on line 20. As long as the pressure in line 20 is at or below the set pressure, pressure controller 18 allows full supply pressure to flow to both pressure control valve 22 and liquid level controller 21. Full supply pressure holds pressure control valve 22 completely open and allows liquid level controller 21 to operate normally to dump through dump valve 23 the condensate from flash separator 1 to reboiler 3. Whenever the pressure in line 20 begins to rise above the predetermined set pressure, pressure controller 18 begins reducing the supply pressure going to pressure control valve 22 and liquid level controller 21. Reduction of the supply pressure causes pressure control valve 22 and dump valve 23 to begin closing. Closing pressure control valve 22 reduces the flow of gas and vapors from gas expansion vessel 15. Closing dump valve 23 reduces the volume of condensate being dumped from vessel 1 to reboiler 3.

As previously described, in one embodiment, back pressure valve 17 is set to maintain a pressure of about 50 psig on flash separator 1 and gas expansion vessel 15, and back pressure valve 24 is set to hold a pressure that is about 20 psig less than the lowest operating pressure of the high pressure separators (not shown). Alternatively, back pressure regulator 24 can be set slightly below the maximum allowable working pressure of flash separator 1 and gas expansion vessel 15. Flash separator 1 and gas expansion vessel 15 are preferably sized with excess capacity to hold the largest liquid slug that are expected to be produced. Electric liquid level control 133 is preferably installed at a level in gas expansion vessel 15 that is above any liquid level that gas expansion vessel 15 is expected to handle. Pressure transducer 131, located in the top of gas expansion vessel 15, is set to send an electrical signal through line 132 to PLC 13 anytime the pressure in gas expansion vessel 15 increases to within about 10 psig of the set pressure of back pressure valve 24. When PLC 13 receives an electric signal from pressure transducer 131, PLC 13 sends an electric signal through line 135 to activate solenoid 136. Activating solenoid 136 causes the pneumatic signal from liquid level control 21 going to dump valve 23 to be vented. Closing dump valve 23 stops condensate from being dumped from flash separator 1 to reboiler 3, thereby reducing the amount of vapors flowing from reboiler 3 and allowing the full capacity of the compressor to be used to rapidly reduce the pressure in flash separator 1 and gas expansion vessel 15. As soon as the pressure in flash separator 1 and gas expansion vessel 15 has been reduced about 20 to about 25 pounds per square inch gauge below the set pressure of back pressure valve 24, PLC 13 opens solenoid 136 re-establishing the connection between liquid level control 21 and dump valve 23. Re-establishing the connection between liquid level control 21 and dump valve 23, returns the unit to operation where pressure controller 18 is controlling the opening of pressure control valve 22 and dump valve 23. After a period of time, the gases and liquids created by the slugging condition are processed and the unit thus returns to normal operation.

Handling of Gases and Vapors Under Normal Operation

Referring to FIG. 1, as previously described, the relative cool flash gases and vapors flow from flash separator 1 through line 53 to point 55. At point 55 the flash gases and vapors from flash separator 1 are combined with the hot vapors stripped from the condensate by the heat of reboiler 3 and the stripping action of stabilizing column 5. The operating pressure of reboiler 3 and stabilizing column 5 is maintained at about 35 psig by back pressure valve 25. From point 55 the combined gas and vapor stream flows through line 56 to point 57. At point 57 the combined gas and vapor stream can split into two streams with one portion of the combined gas and vapor stream flowing through line 59 to cool port 61 of temperature control valve 62 and the other portion flowing through line 60 and heating coil 8 to hot port 65 of temperature control valve 62. Temperature control valve 62 is controlled by thermostat 150 which is mounted in discharge line 28. Line 28 is the hot discharge line from first stage compression cylinder 10. Thermostat 150 is set to control temperature control valve 62 to mix the cool and hot portions of the combined gas and vapor stream to obtain a temperature in inlet scrubber 9 high enough to be above the hydrocarbon dew-point of the combined gas and vapor stream and low enough to maintain the temperature of first stage of compression 10 below approximately 300 degrees Fahrenheit. From the common port 66 of temperature control valve 62, the temperature controlled combined gas and vapor stream flows through line 20 to inlet scrubber 9. Inlet scrubber 9 separates any hydrocarbon liquids that might be in the combined gas and vapor stream. The liquid level in inlet scrubber 9 is maintained by liquid level control 111 and dump valve 27. Liquid hydrocarbons separated by inlet scrubber 9 are dumped through dump valve 27, line 113, and line 101 into hydrocarbon storage tank 26. The liquid free combined gas and vapor stream exits inlet scrubber 9 at point 69 and flows through lines 68 and 51 into suction port 52 of first stage of compression 10. The combined gas and vapor stream exits first compression stage 10 at a temperature in excess of the hydrocarbon dew-point of the combined gas and vapor stream and at an intermediate pressure of about 100 psig. The pressurized and heated combined gas and vapor stream flows through line 28 to point 30. At point 30 the pressurized and heated combined gas and vapor stream can split into two streams with one portion of the combined gas and vapor stream flowing through line 32 to the hot port 33 of splitter valve 34 and the other portion flowing through line 31 and cooling coil 2 to the cool port 36 of temperature control valve 34. The condensates in flash separator 1 serve as a heat sink to cool the hot vapors flowing through cooling coil 2. Temperature control valve 34 is controlled by thermostat 151 which is set to maintain a discharge temperature from second stage of compression 11 that is above the hydrocarbon dew-point of the combined gas and vapor stream but less than 300 degrees Fahrenheit. As further illustrated in FIG. 1, thermostat 151 is mounted in line 44. Line 44 is the hot discharge line from second stage of compression 11. From the common port 38 of splitter valve 34 the temperature controlled combined gas and vapor stream flows through line 37 to the inlet port 39 of interstage scrubber 12. Interstage scrubber 12 separates hydrocarbon liquids that are in the cooled, pressurized, combined gas and vapor stream from first stage compression 10. The liquid level in interstage scrubber 12 is maintained by liquid level control 117 and dump valve 118. Liquid hydrocarbons separated by interstage scrubber 12 are dumped through dump valve 118 and line 119 to point 73. At point 73, liquid hydrocarbons from interstage scrubber 12 are combined in line 72 with the condensates from flash separator 1 and flow to heat exchanger 7. The liquid free combined gas and vapor stream exits interstage scrubber 12 at discharge port 129 and flows through line 128 into the suction port 40 of the second stage of compression 11. The combined gas and vapor stream exits second stage of compression 11 through discharge port 45 at a temperature that is preferably in excess of the hydrocarbon dew point but less than about 300 degrees Fahrenheit and a discharge pressure that is preferably about 200 to about 500 psig. The pressurized and heated combined gas and vapor stream flows through line 41 to point 42. During normal operation, the combined gas and vapor stream flows from point 42 through line 44 to sales 210, but, at times the amount of gas and vapors being produced by the process will not be enough to keep the compressor fully loaded. When needed, pressure regulator 47 causes circulation of enough of the discharged gas and vapors to maintain the suction pressure at about 15 psig in inlet scrubber 9 to flow back through lines 43, 48 and 68.

Handling of Gases and Vapors Under Abnormal Operation

Conditions that create slugging have been previously described in the liquid handling section. When a slug of liquid hydrocarbons is introduced into flash separator 1, the liquid volume displaces, almost instantaneously, the same volume of gas contained in flash separator 1. In addition to the displaced gases the liquid slug creates, almost instantaneously, flash gases and released vapors. The sudden introduction of an increase in the volume of gases and vapors that the unit is required to process will, unless controlled, overload the capacity of the compressor.

As previously described, gas expansion vessel 15 is designed to control the effects of a sudden introduction of a large volume of gas and vapors into the unit. When the volume of gas and vapors entering gas expansion vessel 15 increase enough to exceed the capacity of the compressor, the pressure in gas expansion vessel 15 is allowed to increase. Increasing the pressure in gas flash separator 1, has the effect of increasing the gas and vapor capacity of gas expansion vessel 15 as well as slowing the release of gases and vapors from the liquid hydrocarbons.

As previously described, if the pressure in gas expansion vessel 15 increases to a point where gases can be released to storage tank 26, the full capacity of the compressor is applied to rapidly reduce the pressure in gas expansion 15 by stopping the processing of hydrocarbon liquids in reboiler 3.

In one embodiment, the speed of the compressor of the present invention is preferably variable from about half speed to full speed. The speed of the compressor in this embodiment is optionally controlled by changing the speed of the drive unit, which can optionally be an electrically-powered drive unit, a pneumatic-powered drive unit, an internal combustion drive unit, or a combination thereof.

Referring to FIG. 1, pressure transducer 115 is preferably disposed in inlet scrubber 9. Pressure transducer 115 sends an electric signal through line 116 to PLC 13. PLC 13, responding to pressure transducer 115 sends an electric signal to either a VFD (electric drive) or a governor (internal combustion engine). The VFD or governor varies the speed of the driver and in turn the speed of the compressor depending upon the pressure in inlet scrubber 9.

In case of a mechanical failure, such as a frozen dump line, an inoperable dump valve, etc., which could possibly lead to an uncontrolled release to the environment of hydrocarbon liquids or gases, three-way diverter valve 152 is preferably provided and can be disposed on line 153, the inlet to flash separator 1 and gas expansion vessel 15. In this embodiment, under most operating conditions three-way valve 152 remains open to allow hydrocarbon liquids and gases to enter flash separator 1 and gas expansion vessel 15; however, if a problem should occur that would allow hydrocarbon liquids to rise high enough in expansion vessel 15 to activate electric level control 133, an electric signal is preferably sent through line 134 to PLC 13. PLC 13 then sends an electric signal through line 158 to solenoid 156. Activating solenoid 156, in turn, preferably sends a pneumatic signal through tubing line 157 to three-way valve 152 causing the valve to switch and send all the liquid hydrocarbon production to storage tank 26 via flow line 154. After three-way valve 152 has switched to send all the liquid hydrocarbon production to storage tank 26, a time delay, which can preferably be anywhere from about 1 minute to about 2 hours and is most preferably between about 15 to about 30 minutes is preferably provided. If electric liquid level control 133 remains activated after the time delay, the problem of a high level can be detected and would thus be considered a major malfunction, thereby causing the unit to automatically shut down. If, during the time delay, the liquid level dropped enough to de-activate electric liquid level control 133 the malfunction would thus be considered a possible temporary problem, and the unit would not be automatically shut down. In this case, three-way valve 152 is preferably switched, thus sending the liquid hydrocarbon production to the unit. As soon as three-way valve 152 switches the liquid hydrocarbon production back to the unit, a new timer is preferably activated and most preferably has a duration of about 15 minutes to about 4 hours and most preferably has a duration of about 1 hour. If during the 1-hour event, the fluid level rises again and activates liquid level control 133, the problem would not be consider temporary, in which case the liquid hydrocarbon production is again be switched back to storage tank 26 and the unit is automatically shutdown.

While the bulk of this application discusses a two stage compressor embodiment, on applications where the discharge pressure is high, a compressor having three or more stages can be used. All the operating principles remain the same, regardless of whether a two, three, or more stage compressor is used. The main difference between a unit with a two or three stage compressor is that an additional cooling coil, with a temperature control valve, thermostat, etc., is preferably provided on the three stage compressor to control the compression temperature of the third stage. These additional components are readily observed simply by comparing and contrasting FIGS. 1 and 2.

As illustrated in the three-stage compression system of FIG. 2, the same configuration as was used in the two stage compression system is also preferably used, except that now, instead of line 44 exiting to the gas sales line, it preferably splits at point 173 before being directed into through line 176 to the hot port 177 of splitter valve 169 and the other portion flowing into cooling coil 165 to the cool port 174 of temperature control valve 169. The condensates in flash separator 1 serve as a heat sink to cool the hot vapors flowing through cooling coil 165. Temperature control valve 169 is controlled by thermostat 168 which is set to maintain a discharge temperature from third stage of compression 166 that is above the hydrocarbon dew-point of the combined gas and vapor stream but less than 300 degrees Fahrenheit. As further illustrated in FIG. 2, thermostat 168 is mounted in line 186. Line 186 is the hot discharge line from third stage of compression 166. From the common port 187 of splitter valve 169 the temperature controlled combined gas and vapor stream flows through line 179 to the inlet port 180 of interstage scrubber 167. Interstage scrubber 167 separates hydrocarbon liquids that are in the cooled, pressurized, combined gas and vapor stream from second stage compression 11. The liquid level in interstage scrubber 167 is maintained by liquid level control 170 and dump valve 172. Liquid hydrocarbons separated by interstage scrubber 167 are dumped through dump valve 172 and line 197 to point 73. At point 73, liquid hydrocarbons from interstage scrubber 167 are combined in line 72 with the condensates from flash separator 1 and flow to heat exchanger 7. The liquid free combined gas and vapor stream exits interstage scrubber 167 at discharge port 181 and flows through line 182 into the suction port 183 of the third stage of compression 166. The combined gas and vapor stream exits third stage of compression 166 through discharge port 178 at a temperature that is preferably in excess of the hydrocarbon dew point but less than about 300 degrees Fahrenheit and a discharge pressure that is preferably about 450 to about 1000 psig. The pressurized and heated combined gas and vapor stream flows through line 184 to point 185. During normal operation, the combined gas and vapor stream flows from point 185 through line 186 to sales, but, at times the amount of gas and vapors being produced by the process will not be enough to keep the compressor fully loaded. When needed, pressure regulator 47 causes circulation of enough of the discharged gas and vapors to maintain the suction pressure at about 15 psig in inlet scrubber 9 to flow back through lines 43, 48 and 68.

In one embodiment, the additional components illustrated in FIG. 2, which are not illustrated in FIG. 1, are preferably duplicated again for a four-stage or additional-stage compressor, etc. While embodiments of the present invention preferably use some pneumatic control mechanisms, alternative embodiments of the present invention optionally use other known mechanisms, including but not limited to hydraulic control, electrical control, electro-mechanical control, and combinations thereof in place of one or more of such pneumatic control mechanisms.

Although the invention has been described in detail with particular reference to these preferred embodiments, other embodiments can achieve the same results. Variations and modifications of the present invention will be obvious to those skilled in the art and it is intended to cover, including in the appended claims, all such modifications and equivalents. The entire disclosures of all references, applications, patents, and publications cited above and/or in the attachments, and of the corresponding application(s), are hereby incorporated by reference.

What is claimed is:

1. A slug-containing vapor recovery system comprising:
   a gas expansion vessel communicably coupled to receive an incoming flow of hydrocarbons from a well-stream inlet separator;
   a two-phase, slug-containing flash separator in fluid communication with said gas expansion vessel;
   a first pressure sensor sensing a pressure of contents of said gas expansion vessel;
   an outlet of said gas expansion vessel in fluid communication with a heat exchanger disposed within a two phase stabilizing reboiler; and
   a compressor compressing hydrocarbon vapors, said compressor operating at a first speed when pressure sensed by said first pressure sensor is less than a first predetermined amount and said compressor operating at a second speed when pressure sensed by said first pressure sensor is greater than said first predetermined a mount, said first speed less than said second speed.

2. The system of claim 1 wherein said system diverts said incoming flow of hydrocarbons to bypass at least a portion of said system when said first pressure sensor senses a pressure which is greater than a second predetermined amount.

3. The system of claim 2 wherein said system diverts said incoming flow of hydrocarbons such that they travel from said well-stream inlet separator and into a hydrocarbon storage tank.

4. The system of claim 1 further comprising providing a second pressure sensor in fluid communication with a first flow of hydrocarbon vapors traveling to an inlet scrubber.

5. The system of claim 4 further comprising a flow of liquid hydrocarbon flowing from a flash separator and heated into a vapor before joining said first flow of hydrocarbon vapors.

6. The system of claim 5 further comprising said flow of liquid hydrocarbons reduced from said flash separator when said first pressure sensor senses a pressure in excess of said first predetermined amount.

7. The system of claim 1 wherein said gas expansion vessel comprises a liquid level switch.

8. The system of claim 7 wherein when said incoming flow of hydrocarbons is diverted around at least a portion of said system in response to detection of a liquid by said liquid level switch.

9. The system of claim 8 wherein said incoming flow of hydrocarbons is diverted around at least a portion of said system for a predetermined amount of time.

10. The system of claim 8 wherein said incoming flow of hydrocarbons is diverted into a hydrocarbon storage tank.

11. The system of claim 10 wherein said hydrocarbon storage tank comprises a volume of at least 200 barrels.

12. A slug-containing vapor recovery apparatus comprising:
   a gas expansion vessel, said vessel communicably coupleable to an outlet of a hydrocarbon-producing well;
   a two-phase slug-containing flash separator in fluid communication with said gas expansion vessel;
   a first pressure sensor, said first pressure sensor positioned to sense a pressure of contents of said gas expansion vessel;
   an outlet of said gas expansion vessel in fluid communication with a heat exchanger disposed within a two phase stabilizing reboiler; and
   an at least two-speed compressor, said compressor communicably coupled to an outlet of a first-stage inlet scrubber, said compressor selectively speed controlled based on an output of said first pressure sensor.

13. The apparatus of claim 12 wherein said compressor operates at a speed which is faster when said pressure sensor detects a pressure that is in excess of a predetermined amount, as compared with a speed of said compressor when said sensor detects a pressure that is below said predetermined amount.

14. The apparatus of claim 12 further comprising a liquid level switch positioned to detect a liquid level within said gas expansion vessel.

15. The apparatus of claim 12 wherein a diverting valve activates in response to a sensed liquid level by said liquid level switch.

16. The apparatus of claim 15 wherein said diverting valve is communicably coupleable to an outlet of a hydrocarbon producing well and to an inlet of a hydrocarbon storage tank.

* * * * *